United States Patent

Wu

(10) Patent No.: US 8,249,041 B2
(45) Date of Patent: Aug. 21, 2012

(54) METHOD FOR DETERMINING A PAGING SLOT BY A BASE STATION FOR CDMA TRUNKING SERVICE

(75) Inventor: Chuanxi Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 331 days.

(21) Appl. No.: 12/747,913

(22) PCT Filed: Dec. 16, 2008

(86) PCT No.: PCT/CN2008/073533
§ 371 (c)(1),
(2), (4) Date: Jun. 13, 2010

(87) PCT Pub. No.: WO2009/082928
PCT Pub. Date: Jul. 9, 2009

(65) Prior Publication Data
US 2010/0260160 A1    Oct. 14, 2010

(30) Foreign Application Priority Data
Dec. 21, 2007    (CN) .......................... 2007 1 0301958

(51) Int. Cl.
*H04B 7/216* (2006.01)
(52) U.S. Cl. ....................................................... 370/342
(58) Field of Classification Search .................. 370/342, 370/335, 327
See application file for complete search history.

(56) References Cited

U.S. PATENT DOCUMENTS

| 6,111,865 | A | * | 8/2000 | Butler et al. ................... 370/335 |
| 7,983,696 | B1 | * | 7/2011 | Manghat et al. ............... 455/458 |
| 2005/0014519 | A1 | | 1/2005 | Sinnarajah |
| 2007/0072643 | A1 | * | 3/2007 | Jiang et al. ..................... 455/560 |
| 2007/0232330 | A1 | | 10/2007 | Ranganathan |

FOREIGN PATENT DOCUMENTS

| CN | 1843045 A | 10/2006 |
| EP | 1968226 A1 | 9/2008 |
| WO | 2007073612 A1 | 7/2007 |
| WO | 2007117823 A2 | 10/2007 |

OTHER PUBLICATIONS

International Search Report in international application No. PCT/CN2008/073533, mailed on Mar. 19, 2009, indexed on Jun. 13, 2010 as "P.Pamphlet".
English Translation of the Written Opinion of the International Search Authority in international application No. PCT/CN2008/073533, mailed on Mar. 19, 2009.

* cited by examiner

*Primary Examiner* — Anh-Vu Ly
*Assistant Examiner* — Mohammad Anwar
(74) *Attorney, Agent, or Firm* — Oppedahl Patent Law Firm LLC

(57) ABSTRACT

The present invention discloses a method for determining a paging slot by a base station for CDMA trunking service, wherein the method includes: the base station determine a slot cycle index according to PTT version number of a mobile station, and determine a slot cycle used for the mobile station according to the slot cycle index. The present invention can solve the problem of slow access when the mobile station is called after power-on, which exists in the related art, thus can improve the speed of power-on access, and can determine the paging slot for a base station and a terminal which can not support a minus slot paging.

12 Claims, 4 Drawing Sheets

METHOD FOR DETERMINING A PAGING SLOT BY A BASE STATION FOR CDMA TRUNKING SERVICE

TECHNICAL FIELD

The present invention relates to the field of communications, particularly to a method for determining a paging slot by a base station for CDMA (Code Division Multiple Access) trunking service.

BACKGROUND

At present, there are two paging modes in CDMA system, which are slotted mode and non-slotted mode. The non-slotted mode refers to an operating mode under which a mobile station monitors a forward-paging channel (F-PCH) continuously rather than monitors the F-PCH according to a specific slot.

As the mobile station needs to continuously demodulate and decode the F-PCH, and deal with the messages in the F-PCH, the electricity in batteries is quickly consumed; further, when there is no paging on the F-PCH, the system will circularly broadcast system parameter messages. For a mobile station that has correctly obtained these parameters and is in an idle state, it is also a waste to receive these parameters repeatedly.

Therefore, in order to reduce unnecessary monitoring of a mobile station on the F-PCH and lengthen the service time of the batteries in an idle state, IS-95 specifies a slotted mode. The slotted mode may correspond to the non-slotted mode. When operating in the slotted mode, a mobile station in an idle state does not continuously monitor the F-PCH. Instead, it monitors the F-PCH within a specific time period every specific time interval according to specific rules, and at the interval between monitoring of the F-PCH, the mobile station is equivalently in a sleep state, that is, baseband processor and radio-frequency (RF) circuit reduce or even stop working, thus power consumption can be lowered.

In the slotted mode, the basic unit for time division is slot of the F-PCH. The duration of a slot is 80 ms, that is four 20 ms PCH frames. Under the slotted mode, a mobile station in an idle state usually monitors F-PCH once every specific time interval, and this time interval is called slot cycle, in which usually one or two slots are monitored. The length of a slot cycle is calculated with 1.28 s (=16×80 ms) as a unit, and it must be 1, 2, 4, 8, 16, 32, 64 or 128 times of 1.28 s. If the length of a slot cycle is expressed with T, then $T=1.28 \times 2^i$ s, wherein i is slot cycle index and the value of which may be an integer from 0 to 7, while the maximum value of a slot cycle may be 2048 slots, i.e., 163.84 s. Moreover, a subscriber may adjust the length of a slot cycle through setting the slot cycle index of the mobile station by himself. After adjustment, the length of a slot cycle will be reported to the system through parameter change registration, calling, paging response or other messages.

Further, for the subscriber, the adjusting range of the slot cycle s restricted by the current network configuration. In the system parameter messages of a mobile station in a broadcasting service area, there is a parameter which is the max slot cycle index. This index specifies the maximum slot cycle allowed to be used in the current system, and the slot cycle index actually used by the mobile station needs to be determined according to the actual condition.

As described above, under the slotted mode, a mobile station monitors paging only in a specific time and generally only monitors one or two time slots in a PCH slot cycle, thus power consumption of the mobile station is reduced, and the lifetime of the battery is lengthened. On the other hand, under the non-slotted mode, a mobile station needs to monitor all paging slots.

In a trunking system, in addition to slot cycle index and other parameters of the original system, max PTT (Push To Talk) slot cycle index is also introduced, which specifies the maximum slot cycle index and other parameters allowed to be used in the current PTT system.

Further, in PTT system, various reasons can contribute to a problem of slow access when a mobile station is called after power-on, which restricts PTT call and other functions. However, no technical scheme that can solve this problem is available at present.

SUMMARY

The present invention addresses the problem of slow access when a mobile station is called after power-on, which exists in the related art. The main purpose of the present invention is to provide a modified scheme for determining a paging slot by a base station for CDMA trunking service, to solve at least one of the foregoing problems in the related art.

To achieve the foregoing purpose, according to one aspect of the present invention, a method for determining a paging slot by a base station for CDMA trunking service is provided.

According to the present invention, a method for determining a paging slot by a base station for CDMA trunking service includes: if the base station determines the PTT version number of a mobile station is greater than or equal to the preset value and the base station has obtained the minus slot information of the mobile station, the base station will choose the minimum value among max PTT slot cycle index, PTT slot cycle index, max slot cycle index and slot cycle index as the first slot cycle index, and page the mobile station in a slot cycle based on the first slot cycle index;

if the base station determines the PTT version number of a mobile station is greater than or equal to the preset value and the base station has not obtained the minus slot information of the mobile station, the base station will choose the minimum value among max PTT slot cycle index, max slot cycle index and slot cycle index as the second slot cycle index, and page the mobile station in a slot cycle based on the second slot cycle index;

if the base station determines the PTT version number of a mobile station is smaller than the preset value, then the base station will choose the minimum value of max slot cycle index and slot cycle index as the third slot cycle index, and page the mobile station in a slot cycle based on the third slot cycle index;

when the base station is unable to determine whether a mobile station operates in slotted mode or not, or the base station is unable to determine the slot cycle index of the mobile station, the value of the slot cycle index is set as 1 and then calculation will be made according to the foregoing three methods.

Wherein, the PTT version number of the mobile station corresponds to the function of the mobile station.

Moreover, if the PTT version number of the mobile station is 1, it corresponds to PTT enhanced group call; if the PTT version number of the mobile station is 2, it corresponds to the support of fast access call of the mobile station; if the PTT version number of the mobile station is 3, it corresponds to the support of large group paging of the mobile station; if the PTT version number of the mobile station is 5, it will correspond to the support of minus slot paging of the mobile station and the first stage of PTT conventional group call; if the PTT version number of the mobile station is 6, it corresponds to the support of complementary channel transfer signal and the second stage of PTT conventional group call.

Further, this preset value is any of values 1 to 9.

Besides, the mobile station may include but not be limited to a mobile terminal, a fixed station and a vehicular station.

With the help of the foregoing technical scheme of the present invention, through use of a minus slot, the base station determines the slot cycle index of a paging slot and in the end determines the paging slot cycle according to this index. The present invention can solve the problem of slow access when the mobile station is called after power-on in the related art, thus can improve the speed of power-on access.

Other features and advantages of the present invention will be illustrated in the subsequent description, and partially become obvious in the description, or become understood through implementation of the present invention. The purpose and advantages of the present invention may be realized and obtained through the structures specifically indicated in the given description, claims and drawings.

BRIEF DESCRIPTION OF THE DRAWINGS

The drawings are intended to provide further understanding of the present invention and constitute a part of the description. The drawings and the first embodiments of the present invention together are used to illustrate the present invention but not used to limit the present invention. Among the drawings.

DETAILED DESCRIPTION

Function Summary

To address the problem of slow access when the mobile station is called after power-on, which exists in the related art, embodiments of the present invention put forth a modified scheme for determining a paging slot by a base station for CDMA trunking service. In the embodiments, a minus slot is used at first, then the base station determines the slot cycle index of a paging slot, and in the end determines the paging slot cycle according to this index.

The preferred embodiments of the present invention are described hereinafter with reference to the drawings. It should be understood that the preferred embodiments described here are only intended to describe and explain the present invention but not used to limit the present invention. If there is no conflict, the embodiments of the present invention and the features in the embodiments may be mutually combined.

It should be noted that the mobile station mentioned in the embodiments of the present invention may include a mobile terminal, a fixed station and a vehicular station.

A method for determining a paging slot by a base station for CDMA trunking service is provided according to embodiments of the present invention.

Figure 1:
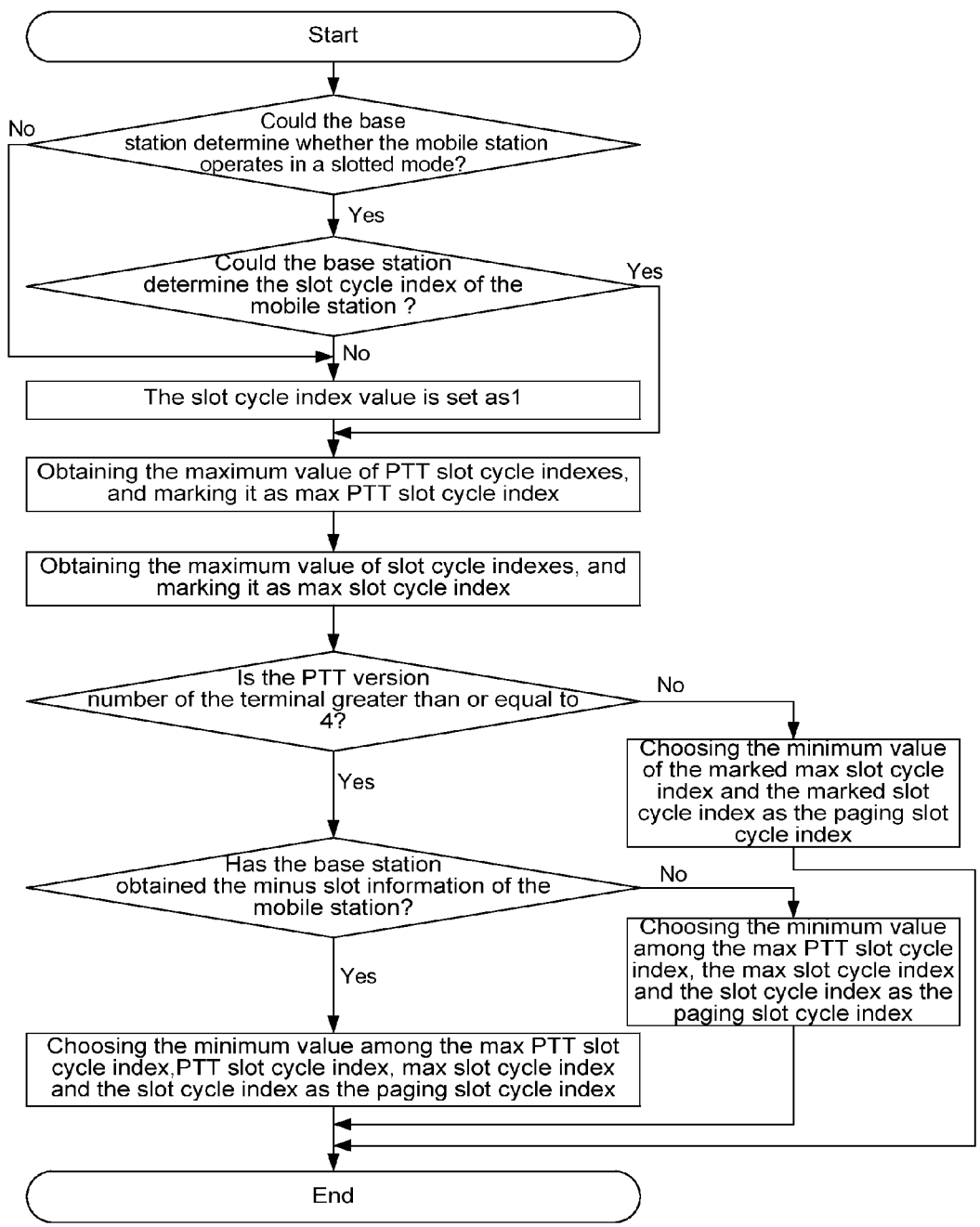
FIG. 1 is a flow chart of a method for determining a paging slot by a base station for CDMA trunking service according to an embodiment of the present invention.

FIG. 1 shows a method for determining a paging slot by a base station for CDMA trunking service according to embodiments of the present invention. As shown in FIG. 1, a method for determining a paging slot by a base station for CDMA trunking service according to embodiments of the present invention includes the follows.

(I) When the base station determines a mobile station operates in a slotted mode, the paging slot may be determined by one of the following three methods.

Method 1: If the base station determines the PTT version number of the mobile station is greater than or equal to the preset value (the preset value is any natural number from 1 to 9), and the base station has obtained the minus slot information of the mobile station, then the base station will choose the minimum value among max PTT slot cycle index, PTT slot cycle index, max slot cycle index and slot cycle index as the first slot cycle index, and page the mobile station in a slot cycle based on the first slot cycle index.

Method 2: If the base station determines the PTT version number of the mobile station is greater than or equal to the preset value, and the base station has not obtained the minus slot information of the mobile station, then the base station will choose the minimum value among max PTT slot cycle index, max slot cycle index and slot cycle index as the second slot cycle index, and page the mobile station in a slot cycle based on the second slot cycle index.

Method 3: If the base station determines the PTT version number of the mobile station is smaller than the preset value, then the base station will choose the minimum value of max slot cycle index and slot cycle index as the third slot cycle index, and page the mobile station in a slot cycle based on the third slot cycle index.

(II) When the base station is unable to determine whether a mobile station operates in slotted mode or not, or the base station is unable to determine the slot cycle index of the mobile station, the value of slot cycle index is set as 1, and then calculation will be made according to the foregoing three methods (Method 1~Method 3).

In the foregoing three methods, according to the correspondence between the PTT version number of a mobile station and the function of the mobile station, the base station determines whether the mobile station can operate in a slotted mode. Table 1 shows the correspondence between the protocol version number of a mobile station and the function of the mobile station.

TABLE 1

| Protocol version number of a mobile station | Functional description of the mobile station |
| --- | --- |
| 1 | PTT enhanced group call |
| 2 | Support of fast access call of the mobile station |
| 3 | Support of large group paging of the mobile station |
| 4 | Reserved |

TABLE 1-continued

| Protocol version number of a mobile station | Functional description of the mobile station |
|---|---|
| 5 | Support of minus slot paging of the mobile station and the first stage of PTT conventional group call |
| 6 | Support of complementary channel transfer signal and the second stage of PTT conventional group call |

Concretely, as shown in Table 1, if the PTT version number of the mobile station is 1, it will correspond to PTT enhanced group call; if the PTT version number of the mobile station is 2, it will correspond to the support of fast access call of the mobile station; if the PTT version number of the mobile station is 3, it will correspond to the support of large group paging of the mobile station; if the PTT version number of the mobile station is 5, it will correspond to the support of minus slot paging of the mobile station and the first stage of PTT conventional group call; if the PTT version number of the mobile station is 6, it will correspond to the support of complementary channel transfer signal and the second stage of PTT conventional group call.

Concretely, when the present invention is executed, if the paging channel (PCH) and forward common control channel (F-CCC) slots of a mobile station for slot cycle index have been given, the base station will use hash function to choose a PGSLOT. The input of the hash function includes IMSI_S of IMSI (International Mobile Subscriber Identity) registered based on a mobile station as well as the maximum value of PCH or common control channel slot, wherein, the PCH or F-CCC slot distributed for the mobile station is as follows:

$$([t/4]PGSLOT) \bmod (16T)=0,$$

where, t is system time in frame; T is slot cycle length, of which unit is 1.28 s; $T=2^i$, i is slot cycle index.

After the method for determining a paging slot by a base station in the present invention is adopted, some influence is also created on the determination of the paging slot of the terminal side that corresponds to the base station. Hereinafter the methods for determining a paging slot are described for two kinds of mobile stations, respectively: (1) a mobile station which does not support minus slot paging; (2) a mobile station which supports minus slot paging. Hereinafter the two methods are described in details.

(1) When a Mobile Station does not Support Minus Slot Paging

Figure 2:
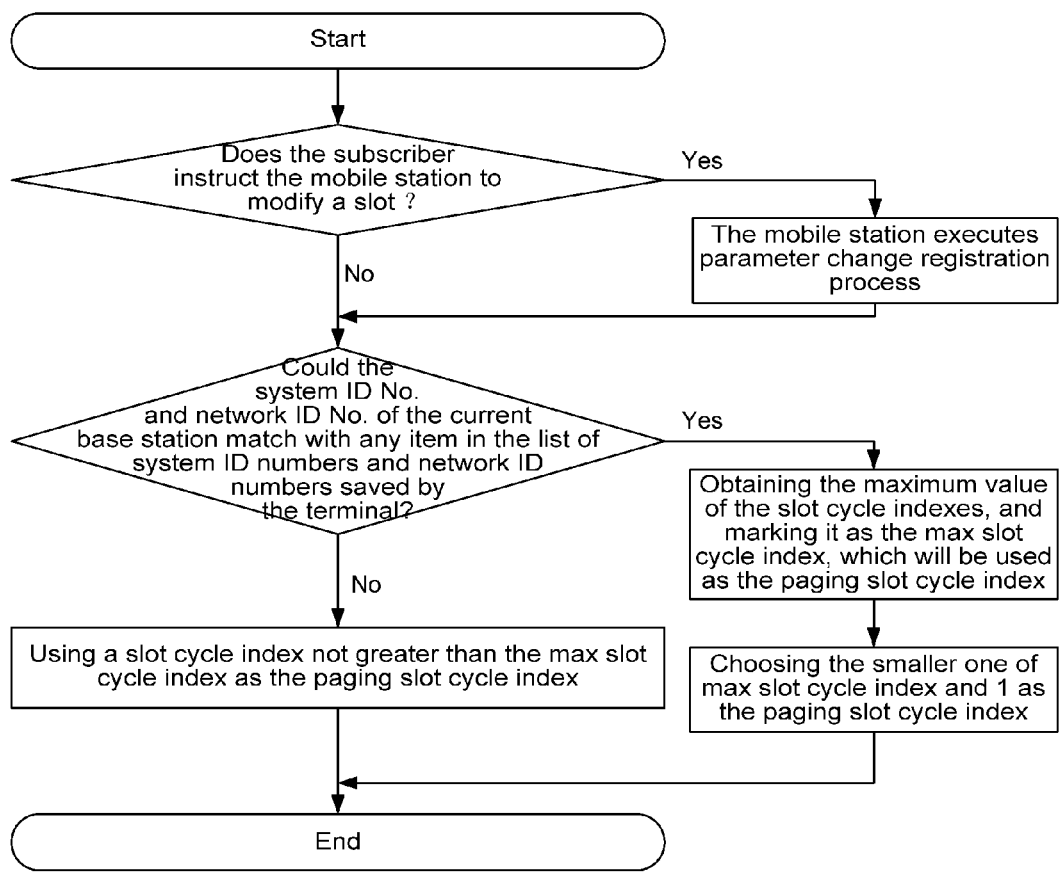
FIG. 2 is a flow chart of a method for determining a paging slot of a mobile station which corresponds to the base station and does not support a minus slot, after a method for determining a paging slot by a base station for CDMA trunking service according to an embodiment of the present invention is adopted.

FIG. 2 shows a flow of a method for determining a paging slot of a mobile station which corresponds to the base station and does not support a minus slot, after a method for determining a paging slot by a base station for CDMA trunking service according to embodiments of the present invention is adopted.

As shown in FIG. 2, if a subscriber instructs a mobile station to modify a slot cycle index, then the mobile station will execute parameter change registration. Under the condition that a mobile station does not support a minus slot, if the system identification (ID) No. and network ID No. of the base station can not match with any item in the list of system ID numbers and network ID numbers, the mobile station will choose a value which is not greater than the smaller one between max slot cycle index and 1 as the slot cycle index. Otherwise, the mobile station will use the slot cycle index which is not greater than max slot cycle index.

Further, in this method, system ID No. and network ID No. are stored in system parameter messages or ANSI-41 system parameter messages.

(2) When a Mobile Station Supports Minus Slot Paging

Figure 4:
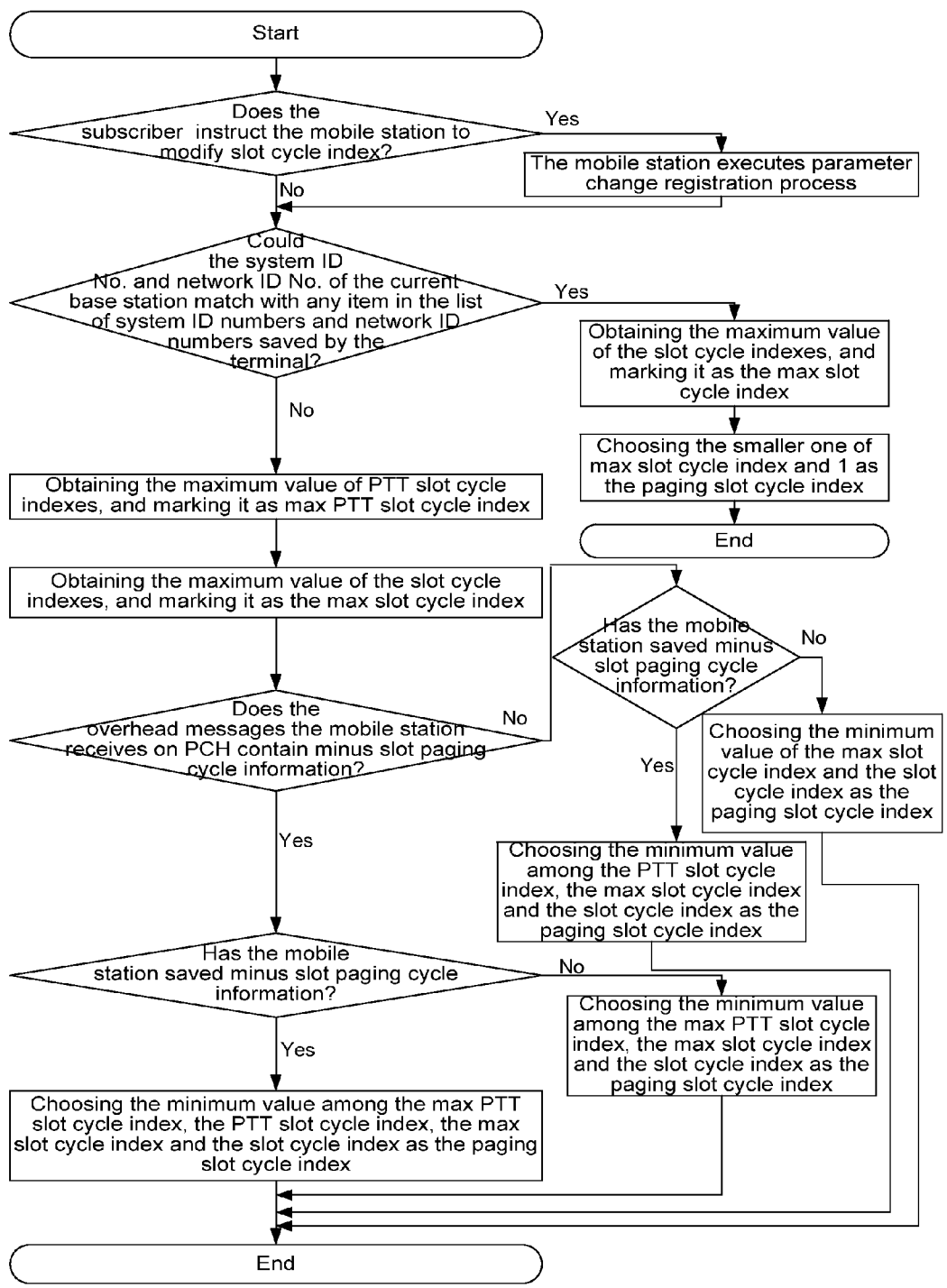
FIG. 4 is a flow chart of a method for determining a paging slot of a mobile station which corresponds to the base station and supports a minus slot, after a method for determining a paging slot by a base station for CDMA trunking service according to an embodiment of the present invention is adopted.

FIG. 4 is a flow of a method for determining a paging slot of a mobile station which corresponds to the base station and supports a minus slot, after a method for determining a paging slot by a base station for CDMA trunking service according to embodiments of the present invention is adopted.

As shown in FIG. 4, first of all, if a subscriber instructs a mobile station to modify a slot cycle index, then the mobile station will execute parameter change registration;

Afterwards, under the condition that the mobile station supports a minus slot, if the system ID No. and network ID No. of the base station can not match with any item in the list of system ID numbers and network ID numbers, the mobile station will choose a value which is not greater than the smaller one between max slot cycle index and 1 as the slot cycle index. Otherwise:

case 1: If the mobile station receives minus slot paging cycle information from an overhead message on PCH, and has saved minus slot cycle information, then the mobile station calculates a paging slot through obtaining a minimum value from four parameters: max PTT slot cycle index, PTT slot cycle index, max slot cycle index and slot cycle index;

case 2: if the mobile station receives minus slot paging cycle information from an overhead message on PCH, but has not saved minus slot cycle information, then the mobile station calculates a paging slot through obtaining a minimum value from three parameters: max PTT slot cycle index, max slot cycle index and slot cycle index;

case 3: if the mobile station does not receive minus slot paging cycle information from an overhead message on PCH, but has saved minus slot cycle information, then the mobile station calculates a paging slot through obtaining a minimum value from three parameters: PTT slot cycle index, max slot cycle index and slot cycle index; and case 4: if the mobile station does not receive minus slot paging cycle information from an overhead message on PCH and has not saved minus slot cycle information, then the mobile station calculates a paging slot through obtaining a minimum value from max slot cycle index and slot cycle index.

After the method of the present invention is adopted, some influence is also created on the method for determining a paging slot by a base station when non-trunking service is executed. The details are described below.

Figure 3:
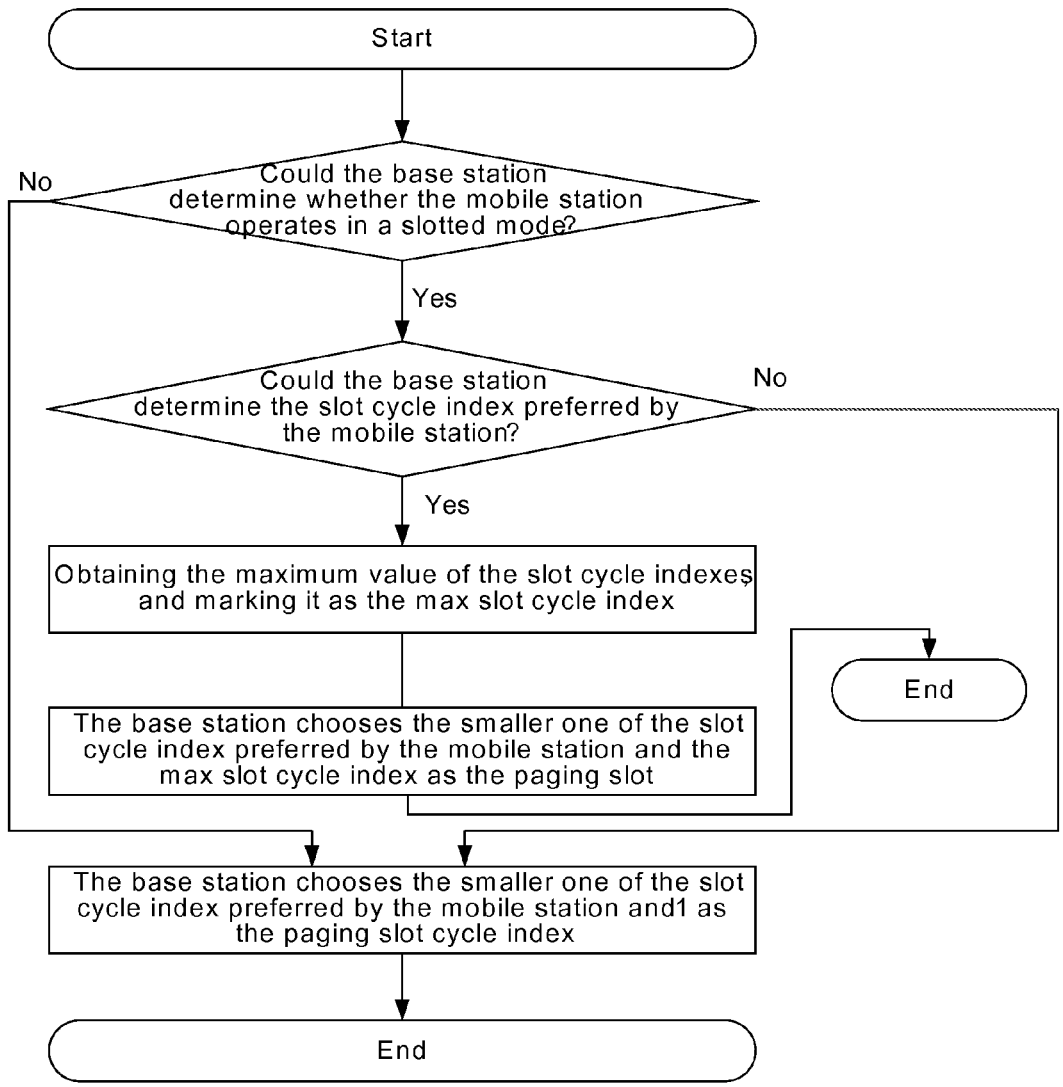
FIG. 3 is a flow chart of a method for determining a paging slot by a base station when non-trunking service is executed, after a method for determining a paging slot by a base station for CDMA trunking service according to an embodiment of the present invention is adopted.

FIG. 3 shows a flow of a method for determining a paging slot by a base station when non-trunking service is executed, after a method for determining a paging slot by a base station for CDMA trunking service according to embodiments of the present invention is adopted.

As shown in FIG. 3, the method for determining a paging slot by a base station when non-trunking service is executed includes: if the base station determines a mobile station operates in a slotted mode and the base station determines the slot cycle index preferred by the mobile station, the smaller one of the slot cycle index preferred by the mobile station and max slot cycle index will be chosen as the fourth slot cycle index, and the base station will page the mobile station in the slot cycle based on the fourth slot cycle index; and when the base station is unable to determine whether the mobile station operates in slotted mode or not, or the base station is unable to determine the slot cycle index of the mobile station, the smaller one of the slot cycle index preferred by the mobile station and 1 will be chosen as the fifth slot cycle index, and the base station will page the mobile station in the slot cycle based on the fifth slot cycle index.

Hereinafter the process for determining a paging slot by a based station for CDMA trunking service and a paging slot of a mobile station correlative with the base station is described with reference to specific embodiments.

Embodiment 1

On PTT terminal side, under the circumstance that a plurality of terminals including A and B are in a same group and all belong to base station C, the paging slot cycles of terminal A and base station C are determined. It is supposed that the value of Max PTT Slot Cycle Index on the side of base station C is 4, the current value of PTT Slot Cycle Index is −1, the value of Slot Cycle Index is 4 and the value of Max Slot Cycle Index is 6.

First of all, terminal A is powered on, conducts power-on registration and receives system parameter messages. Once these parameters messages are received, terminal A may determine its own paging slot based on these parameters. If terminal A receives minus slot paging cycle information from overhead messages on PCH (obtain Max PTT Slot Cycle Index from PTT system parameter messages) and has saved minus slot paging cycle information (for example, PTT Slot Cycle Index), terminal A will calculate a paging slot according to the formula: Min(Max PTT Slot Cycle Index, PTT Slot Cycle Index, Max Slot Cycle Index, Slot Cycle Index), that is: get the minimum value from (4, −1, 6, 4), thus choose −1 as its paging slot cycle.

Afterwards, the paging slot of base station C is determined. If the PTT version number that terminal A sends to base station C is equal to 5 and the value of Slot Cycle Index of terminal A is −1, base station C will page terminal A according to the slot cycle index determined by the formula: Min (Max PTT Slot Cycle Index, PTT Slot Cycle Index, Max Slot Cycle Index, Slot Cycle Index), that is: get the minimum value from (4, −1, 6, −1), thus choose −1 as the slot cycle index to page terminal A.

Embodiment 2

On PTT terminal side, under the circumstance that a plurality of terminals including A and B are in a same group and all belong to base station C, the paging slot cycles of terminal A and base station C are determined. It is supposed that the value of Max PTT Slot Cycle Index on the side of base station C is 4, the current value of PTT Slot Cycle Index is 1, the value of Slot Cycle Index is 4 and the value of Max Slot Cycle Index is 6.

First of all, terminal A is powered on, conducts power-on registration and receives system parameter messages. Once these parameters messages are received, terminal A may determine its own paging slot based on these parameters.

If terminal A does not receive minus slot paging cycle information from overhead messages on PCH, but has saved minus slot paging cycle information, terminal A will calculate a paging slot according to the formula: Min(PTT Slot Cycle Index, Max Slot Cycle Index, Slot Cycle Index), that is: get the minimum value from (1, 6, 4), thus choose 1 as the current paging slot cycle index.

Afterwards, a paging slot is determined on the side of base station C. If the PTT version number that terminal A sends to base station C is equal to 6 and the value of Slot Cycle Index of terminal A is 1, base station C will page terminal A according to the slot cycle determined by the formula: Min(Max PTT Slot Cycle Index, PTT Slot Cycle Index, Max Slot Cycle Index, Slot Cycle Index), that is: get the minimum value from (4, 1, 6, 1), and in the end choose 1 as the slot cycle index, thus base station C pages terminal A according to this slot cycle index.

Besides, the embodiments may be realized through hardware, software, firmware, middleware, microcode or hardware description language or their combination. When the embodiments are realized through software, firmware, middleware or microcode, the program codes or code segments used for execution of necessary tasks may be stored in machine readable medium, storage medium for example. (Multiple) processors may execute necessary tasks. Code segments may express any combination of process, function, subprogram, program, routine program, routine subprogram, module, object, software package, type, or instruction, data structure or program language. A code segment is coupled to another code segment or hardware circuit through transmission and/or reception of information, data, independent variables or storage content. Information, independent variables, parameters and data may be transmitted, transported or transferred by any appropriate means such as shared memory, message transfer, token passing or network transmission.

To summarize, with the help of the foregoing technical scheme of the present invention, through the use of a minus slot, a base station determines the slot cycle index of a paging slot and in the end determines the paging slot according to this index. The prevent invention can solve the problem of slow access when the mobile station is called after power-on, which exists in the related art, and improve the speed of power-on access, and determine the paging slot for a base station and a terminal which can not support a minus slot paging.

The foregoing descriptions are only preferred embodiments of the present invention and are not intended to limit the present invention. For those skilled in the art, the present invention may have various changes and modifications. All modifications, identical replacements and improvements made without departing from the spirit and principle of the present invention shall be within the protection scope of the present invention.

What is claimed is:

1. A method for determining a paging slot by a base station for Code Division Multiple Access (CDMA) trunking service, comprising:

if the base station determines the Push To Talk (PTT) version number of a mobile station is greater than or equal to the preset value, and the base station has obtained the minus slot information of the mobile station, then the base station choosing the minimum value among max PTT slot cycle index, PTT slot cycle index, max slot cycle index and slot cycle index as the first slot cycle index, and paging the mobile station in the slot cycle determined by the first slot cycle index;

if the base station determines the PTT version number of the mobile station is greater than or equal to the preset value, and the base station has not obtained the minus slot information of the mobile station, the base station choosing the minimum value among the max PTT slot cycle index, the max slot cycle index and the slot cycle index as the second slot cycle index, and paging the mobile station in the slot cycle determined by the second slot cycle index; and if the base station determines the PTT version number of the mobile station is smaller than the preset value, the base station choosing the minimum value of the max slot cycle index and the slot cycle index as the third slot cycle index, and paging the mobile station in the slot cycle determined by the third slot cycle index; when the base station is unable to determine whether the mobile station operates in a slotted mode or not, or unable to determine the slot cycle index of the mobile station, the value of the slot cycle index being set as 1.

2. The method according to claim 1, wherein, the PTT version number of the mobile station corresponds to the function of the mobile station.

3. The method according to in claim 2, wherein, if the PTT version number of the mobile station is 1, it corresponds to PTT enhanced group call; if the PTT version number of the mobile station is 2, it corresponds to the support of fast access call of the mobile station; if the PTT version number of the mobile station is 3, it corresponds to the support of large group paging of the mobile station; if the PTT version number of the mobile station is 5, it corresponds to the support of minus slot paging of the mobile station and the first stage of PTT conventional group call; and if the PTT version number of the mobile station is 6, it corresponds to the support of complementary channel transfer signal and the second stage of PTT conventional group call.

4. The method according to claim 3, wherein, the present value is any of values 1 to 9.

5. The method according to claim 4, wherein, the mobile station includes mobile terminal, fixed station and vehicular station.

6. The method according to claim 3, wherein, the mobile station includes mobile terminal, fixed station and vehicular station.

7. The method according to claim 2, wherein, the present value is any of values 1 to 9.

8. The method according to claim 7, wherein, the mobile station includes mobile terminal, fixed station and vehicular station.

9. The method according to claim 2, wherein, the mobile station includes mobile terminal, fixed station and vehicular station.

10. The method according to claim 1, wherein, the present value is any of values 1 to 9.

11. The method according to claim 10, wherein, the mobile station includes mobile terminal, fixed station and vehicular station.

12. The method according to claim 1, wherein, the mobile station includes mobile terminal, fixed station and vehicular station.

* * * * *